United States Patent [19]
Glozer et al.

[11] Patent Number: 5,501,594
[45] Date of Patent: Mar. 26, 1996

[54] APPARATUS FOR FORMING A THERMOPLASTIC BODY

[75] Inventors: Gary R. Glozer, Spencerport; Edgar G. Earnhart, Hilton; Brett J. Le Beau, Sr., Rochester; Andrea E. Marek, Livonia; Rudy Trick, Rochester; James E. Vianco, Webster, all of N.Y.

[73] Assignee: Eastman Kodak Company, Rochester, N.Y.

[21] Appl. No.: 197,896

[22] Filed: Feb. 16, 1994

[51] Int. Cl.⁶ .................................................. B29C 45/20
[52] U.S. Cl. .................... 425/549; 264/328.15; 425/562; 425/563; 425/566
[58] Field of Search ...................................... 425/566, 549, 425/DIG. 227, 562, 563; 264/328.15

[56] References Cited

U.S. PATENT DOCUMENTS

| | | |
|---|---|---|
| 2,814,831 | 12/1957 | McKee, Jr. . |
| 2,871,517 | 2/1959 | Allard . |
| 3,113,346 | 12/1963 | Bright . |
| 3,281,898 | 11/1966 | Compton . |
| 3,976,226 | 8/1976 | Monnet ................................ 425/130 |
| 4,376,625 | 3/1983 | Eckardt ................................ 425/564 |
| 4,424,622 | 1/1984 | Krause ................................. 29/611 |
| 4,492,556 | 1/1985 | Crandell .............................. 425/549 |
| 4,500,280 | 2/1985 | Astier et al. ........................ 425/569 |
| 4,644,140 | 2/1987 | Hillinger ............................. 219/535 |
| 4,648,833 | 3/1987 | Yamada ............................... 425/549 |
| 4,669,971 | 6/1987 | Gellert ................................. 425/562 |
| 4,685,881 | 8/1987 | Sasaki .................................. 425/562 |
| 4,787,840 | 11/1988 | Gellert ................................. 425/564 |
| 4,836,766 | 6/1989 | Gellert ................................. 425/562 |
| 5,030,076 | 7/1991 | Ebenhofer et al. ................. 425/562 |
| 5,046,942 | 9/1991 | Gellert ................................. 425/549 |
| 5,366,369 | 11/1994 | Gellert ................................. 425/549 |

FOREIGN PATENT DOCUMENTS

| | | |
|---|---|---|
| 58-39428 | 3/1983 | Japan . |
| 1126448 | 7/1983 | U.S.S.R. . |
| 1075882 | 7/1967 | United Kingdom . |
| 1442795 | 1/1973 | United Kingdom ......... 425/DIG. 227 |

*Primary Examiner*—Tim Heitbrink
*Attorney, Agent, or Firm*—Susan L. Parulski

[57] ABSTRACT

An improved hot tip (40) for forming a thermoplastic body having a mold cavity (42) and a gate portion (44) has an elongated body member (46) and a channel (48) passing axially through the body member (46). The channel (48) has an inlet end (51) and outlet end (52) for passing a molten material, such as an amorphous resin, therethrough. The body member (46) has a necked-down portion (54) surrounding the outlet end (52) of the channel (48). The necked down portion (54) is configured to permit the outlet end (52) of the channel (48) to proximately contact the gate portion (44) of the mold cavity (42) resulting in a formed body having vestigeless gate.

4 Claims, 4 Drawing Sheets

APPARATUS FOR FORMING A THERMOPLASTIC BODY

FIELD OF THE INVENTION

The present invention relates to an apparatus and method for forming a thermoplastic body. More particularly, the invention concerns forming a thermoplastic body, such as photographic spools, cartridges and the like, having a vestigeless gate by configuring the body member of the apparatus or injection molding nozzle to conform with the gate portion of the mold cavity.

BACKGROUND OF THE INVENTION

Injection molding nozzles employing gating designs for hot runner molds typically include hot tip, hot edge gate, thermal shutoff (hot sprue), valve gate, and multiple tip variations of hot tip and hot edge gates. Hot gate designs are generally either externally or internally heated. To reduce molding cycle times and improve gate vestige attributes (i.e., protuberances), the diameter of the gate is usually made relatively small (0.025 inches to 0.060 inches) or (0.064 cm to 0.152 cm). Both externally and internally heated hot tips are presently available that pass the melt over the outside of the heated tip to allow the tip to be positioned closer to the gate and reduce the height of the vestige. Illustrated in FIG. 1, externally heated hot tips 10 normally require a diverted tip member (molten flow being directed from orifices 12, 14 surrounding the tip member) which has a passage 16 for the melt stream to exit around the center 18 of tip member (denoted by arrows) so that the melt can pass over the exterior 20 of the tip member. Moreover, diverted hot tips 10 generally result in a thin annular orifice in the gate portion 21 of the mold cavity 23 with fragile pointed hot tips. The gate portion 21 is generally defined as the connection between the injection nozzle and the molded part. The gate portion must permit enough material to flow into the mold cavity to fill out the part plus such additional material as is required to overcome the normal thermal shrinkage of the part (See generally Joel Frados, *Plastics Engineering Handbook of the Society of Plastics Engineering*, Chapter 6, "Designing Molds for Injection Molding", page 137, 1976). Thus, diverted hot tips are considered sensitive to contamination, processing temperature, tip wear and damage.

Illustrated in FIG. 2, another conventional hot tip 22 has a passage 24 through to the end 26 of the tip member (referred to generally as a flow through or alternatively straight through hot tip). Nominally this hot tip design, such as the Husky Part No. 532994 made by the Husky Corporation of Bolton, Ontario, Canada, is intended to solve the problems associated with multiple flow fronts affecting part flatness and dimensional control of the molded part, specifically for large thin walled parts molded of crystalline materials like polyethylene or polypropylene. These latter materials are sensitive to flow lines and processing pressures. Flow lines are caused by the union of two or more flow fronts, usually having different temperatures, in the mold cavity. The specific geometry of existing flow through hot tips was not designed to get the end of the tip positioned far enough into the gate portion 28 of the mold cavity 30 for achieving short gate vestige height control. Also, this design was not intended to be used with amorphous materials, such as polystyrene resins. The end of the tip is positioned too far away from the gate portion 28 of the mold cavity 30 and the amorphous resin, during molding process, will tend to solidify before the mold cavity 30 can be filled.

More recently it has become desirable for very high volume molding requiring high cavitation molds with short molding cycle times. High cavitation molds are multiple-cavity molds for use in forming more than one part at a time. These molds primarily utilize hot runner manifolds with hot tip gating for reduced cycle time, increased cavitation and reduced maintenance. One problem associated with these hot tips is gate plugging due to material contamination or particulate matter contained in the melt. Another problem required to be overcome with these devices is gate vestige or protuberances on the finished part due to process condition variations and damage. Moreover, gate string problems, i.e., hair-like plastic material attached to the mold cavity after completion of the mold cycle, are also manifest with such devices due to process temperature and material variations.

Furthermore, the above problems are particularly pronounced with certain molten plastic materials. Particularly troublesome is the use of amorphous resins, like polystyrene, because they do not have a clearly defined glass transition temperature as with crystalline resins. The drive for higher efficiencies, increased process stability and the ability to process post consumer recycled resins motivated the inventors to consider or design alternate hot runner gate designs to minimize or eliminate the above problems.

While there have been numerous improvements in injection molding nozzles, such as described in U.S. Pat. No. 5,046,942 by Gellert, U.S. Pat. No. 4,648,833 by Yamada, and Japanese Patent Application No. 56-139073 by Jiyuuou et al., none have been directed specifically to solving above problems. Jiyuuou et al., Gellert '942 and Yamada '833 each teaches a method of thermally cycling the tip for controlling resin flow. Further, U.S. Pat. No. 2,814,831 to McKee, Jr. describes an injection nozzle with a hemispherical tip especially suited for flat bottom or dish-like articles.

SUMMARY OF THE INVENTION

Accordingly, it is an object of the present invention to provide an apparatus for eliminating gate plugging caused by resin contamination.

Another object of the present invention is to provide an apparatus and method having greater process latitude for controlling the occurrence of gate vestige and stringing.

Yet another object of the present invention is to eliminate vestige gates in the molded part.

Moreover, another object of the invention is to provide a hot tip or injection nozzle design retrofitable to existing mold equipment.

A further object of the present invention is to provide an improved hot tip capable of being positioned in proximate contact with the gate portion of the mold cavity.

To solve one or more of the problems above, it is provided in one aspect of the invention, an improved hot tip for use in an apparatus for forming a thermoplastic body within a mold cavity having a gate portion, the hot tip comprising an elongated body member and a channel extending axially through the body for passing a molten material therethrough. The channel includes an inlet end and an outlet end. A necked down portion of the body member surrounds the end of the channel. In this embodiment, the necked down portion of the body member is configured to permit the outlet of the channel to proximately contact the gate portion so that the molten material will pass through the channel directly into the gate portion of the mold cavity.

Another solution to the above problems is provided by equipment for molding a body within a cavity, the equipment having an injection nozzle or hot tip, as described above.

Still another solution to one or more problems is provided by a method of forming a thermoplastic body within a mold cavity having a gate portion and wherein an injection nozzle (or hot tip) is positioned proximately in the gate portion so that molten material will flow directly into the gate portion. According to this embodiment, the method comprises the step of providing the equipment, described above. Next a molten thermoplastic material, preferably an amorphous resin material, is provided for passing through the channel directly into the gate portion of the mold cavity. Then, the outlet end of the channel is positioned in proximate contact with the gate portion of the mold cavity. Finally, the molten material is passed through the inlet and outlet ends of the channel and directly into the gate portion; and, then the material passes into the mold cavity, thereby forming the body.

Accordingly, advantageous effects of the apparatus of the present invention are that it is of simple design, easy to manufacture, provides substantial vestige control over a wider process latitude and is retrofitable into existing commercial equipment.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE INVENTION

Figure 3:
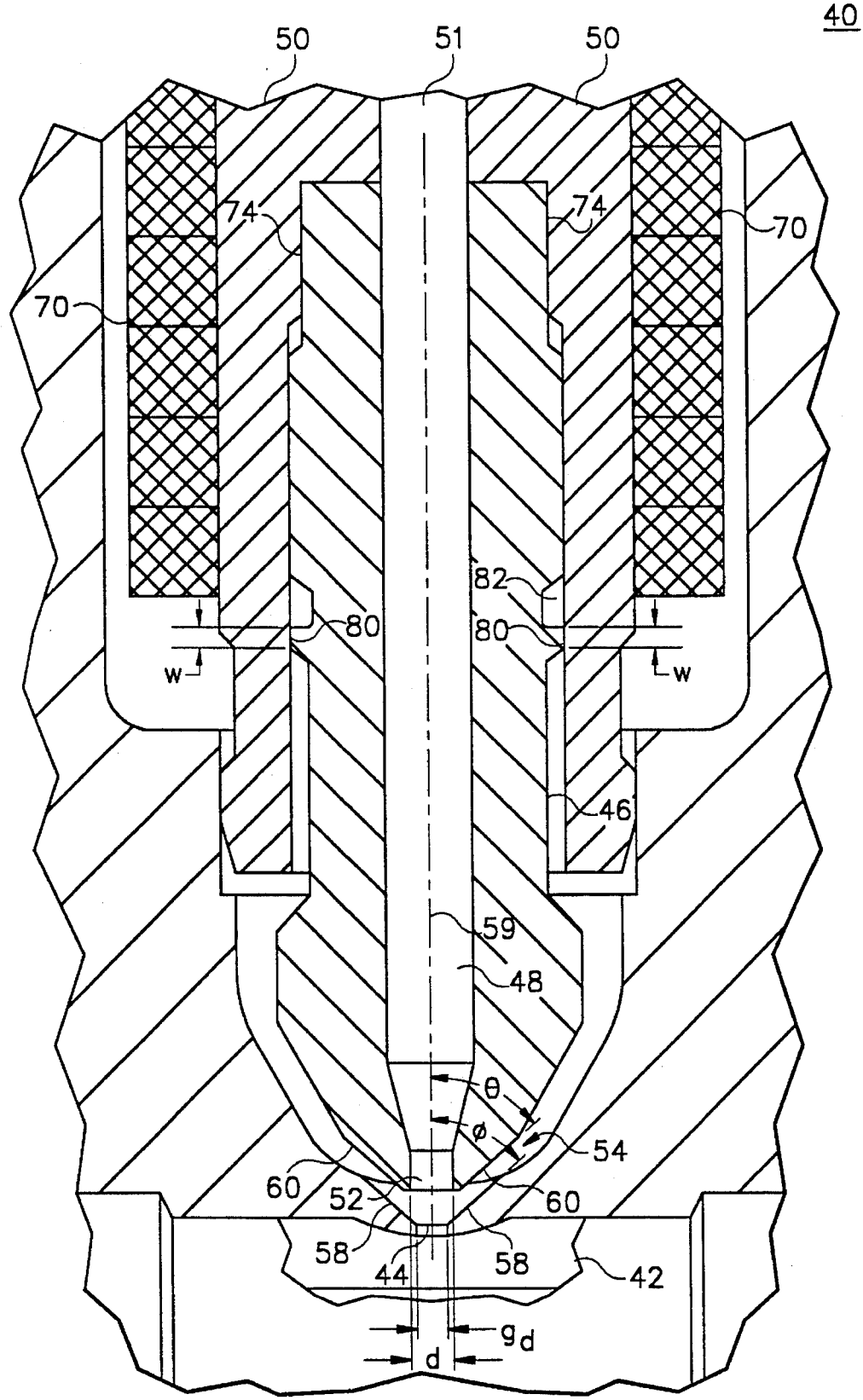
FIG. 3 is a cross section along the center line of the apparatus including the gate portion of the mold cavity according to the principles of the invention.
Figure 4:
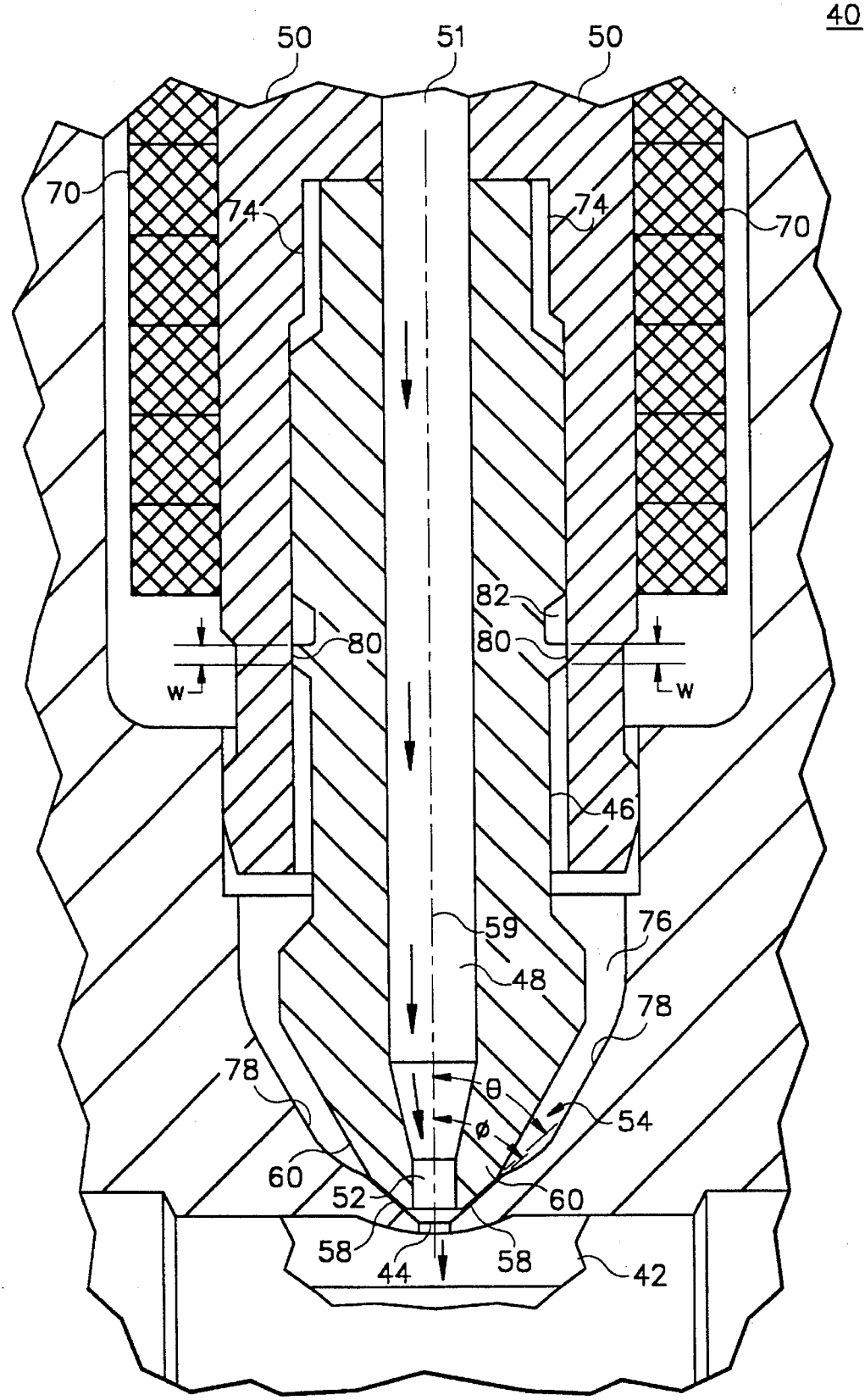
FIG. 4 is the view of FIG. 3 with tip in contact with the gate portion of the mold cavity.

Referring now to the drawings, and in particular to FIGS. 3–4, an improved hot tip 40 for use in an apparatus or equipment 50 for forming a thermoplastic body within a mold cavity 42 having a gate portion 44 is illustrated. Broadly defined, hot tip 40 includes an elongated body member 46 having a channel 48 extending axially therethrough. Channel 48 has an inlet end 51 for receiving a molten material and an outlet end 52 for discharging the molten material into the mold cavity 42. In the preferred embodiment, body member 46 includes a necked down portion 54, described fully below, configured to permit the outlet end 52 of the channel 48 to proximately contact the gate portion 44 of the mold cavity=53, as further described below. This arrangement of the outlet end of the channel and the gate portion enables the molten material to pass through the channel 48 directly into the gate portion 44 of the mold cavity 42, as denoted by arrows. Test results indicate that vestige gates or protuberances which normally remain on the molded body at the conclusion of the molding cycle with conventional hot tips, are eliminated with the above molding configuration.

Figure 1:
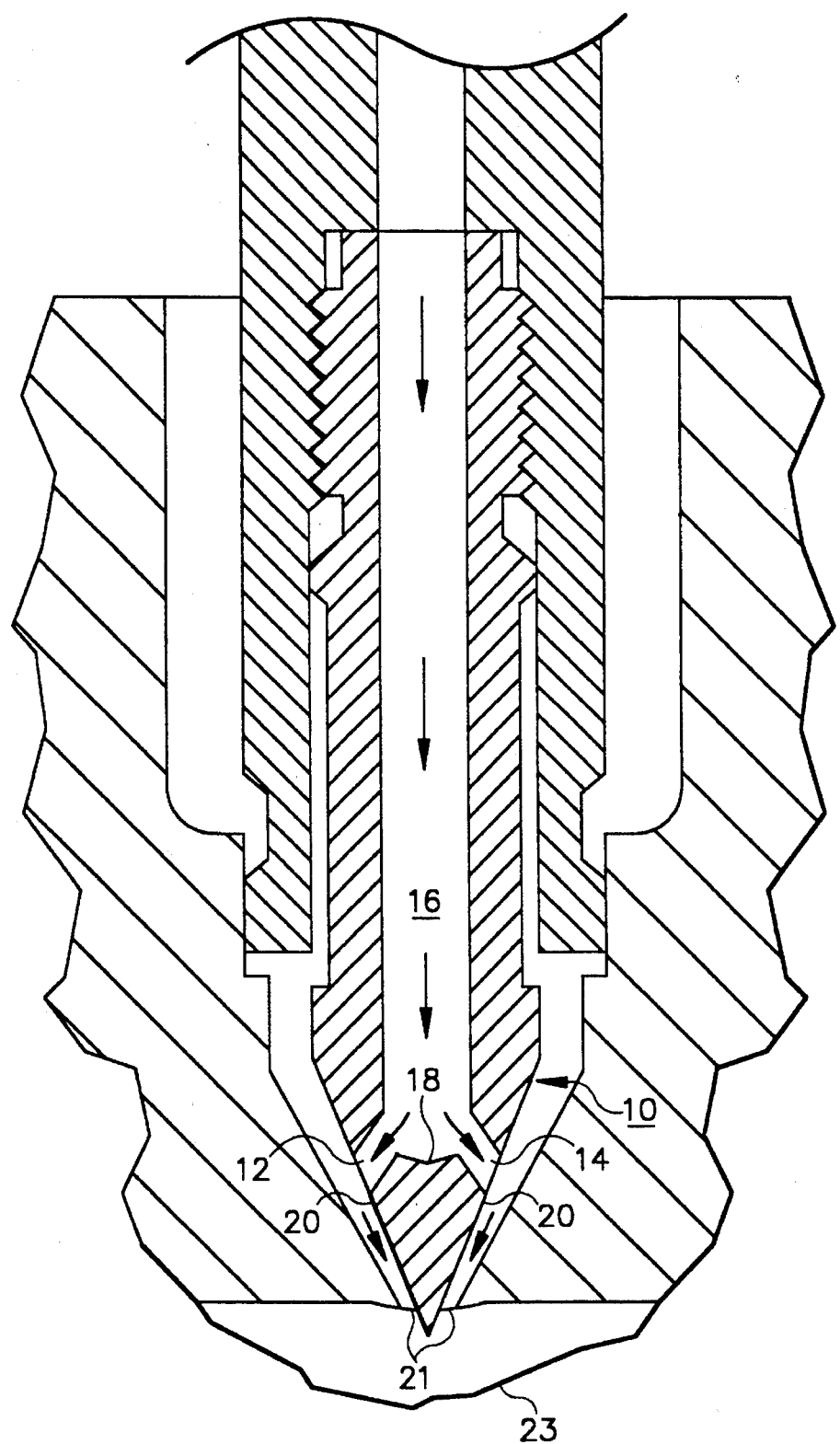
FIG. 1 illustrates a typical diverted hot tip of the prior art.
Figure 2:
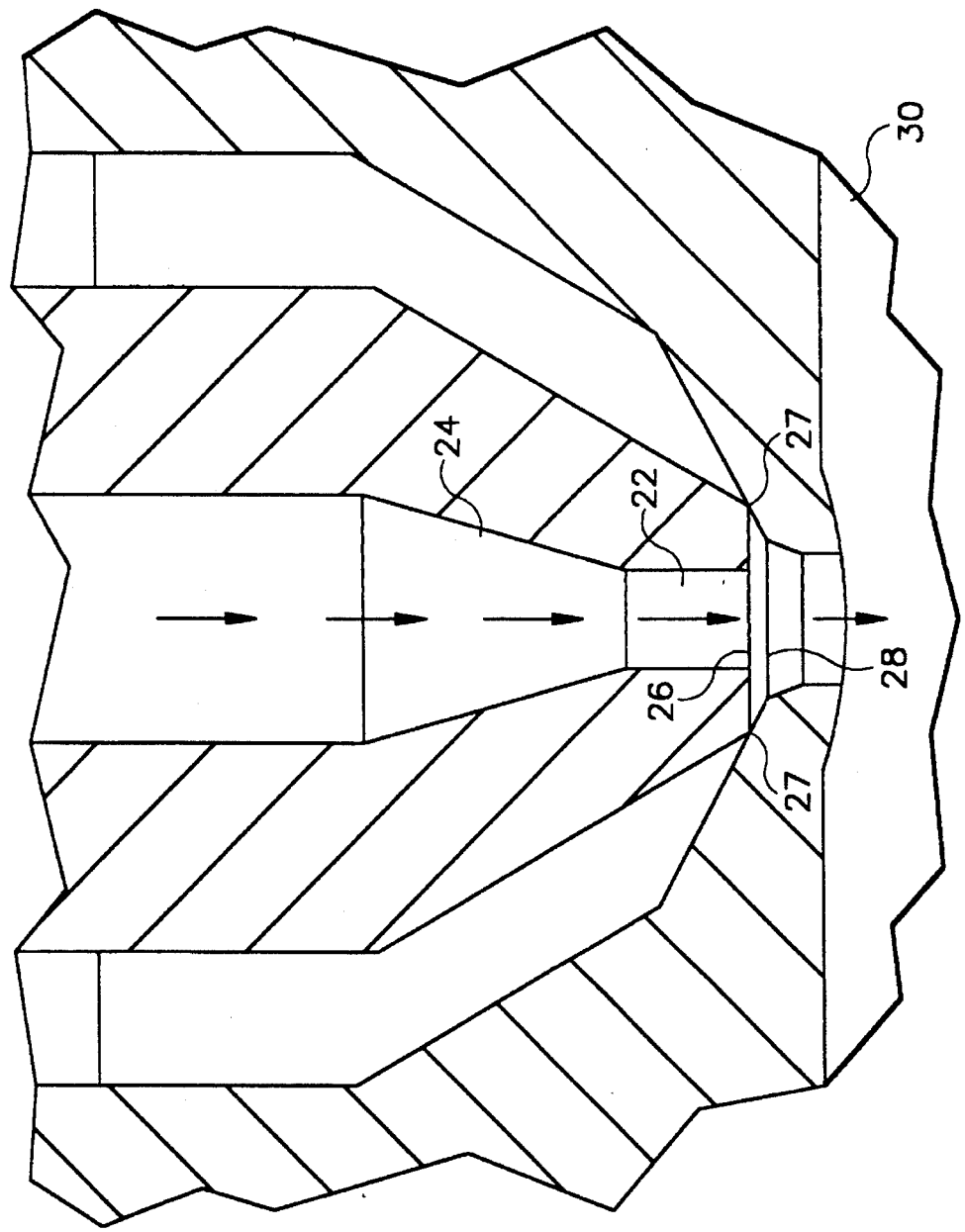
FIG. 2 illustrates a conventional straight through hot tip injection molding device in relations to a gate portion of a mold cavity.

In FIGS. 3 and 4, gate portion 44 of mold cavity 42 has an angle $\phi$ defined by the walls 58 surrounding the gate portion 44 and a central axis 59 passing through the center of the gate portion 44. FIG. 3 depicts the tip 40 in an exaggerated spaced relations with the gate portion 44 to clearly illustrate the angle $\phi$ of the gate portion, and the angle of the necked down portion 54 (described below). To permit the outlet end of the channel to be in proximate contact with the gate portion 44, the shape of outlet end 52 of body member was configured so that it conforms with $\phi$ when the outlet is in fluid communication with the mold cavity 42. As can be appreciated in FIG. 2, conventional flow through hot tips are not designed to contact the gate portion and in fact the design has interference portions 27 at the outlet end which makes it impossible to move the outlet end into contact with the gate portion 28 of the mold cavity 30. Thus direct molten material flow into the gate portion is not achievable with the conventional design hot tip.

According to FIGS. 3 and 4, in the preferred embodiment of the invention, the outlet end 52 is spaced up to about 0.015 inches (0.038 cm) away from the gate portion. Of course, the outlet end 52 may, however, be positioned in contact with the gate portion 44 of the mold cavity 42. Preferably, the outlet end 52 is spaced 0.005 inches from the gate portion 44. It has been determined that at this clearance, enhancements resulted in the molding process latitude as well as the quality of the finished part. In general, if the distance between the outlet end 52 and the gate portion 44 of the mold cavity 42 was too large, the molten material passing into the gate portion 44 would tend to prematurely solidify and prevent parts from being molded. This is because the molten material exiting the channel 48 cools when exposed to ambient temperatures, and then passes into the gate portion 44 of the mold cavity 42. The resultant thermal gradient is sufficient to cause the molten material to solidify at the gate portion 44.

In FIG. 3, outlet end 52 of channel 48 is depicted, for illustrative purposes, spaced from the gate portion 44. As shown in FIGS. 3 and 4, the necked down portion 54 of hot tip comprises a peripheral wall 60 having a substantially conical shape. As best seen in FIG. 3, the necked down portion 54 has an angle $\Theta$ defined by peripheral wall 60 and a central axis 59 passing through the channel 48. In the preferred embodiment of the present invention, the necked down portion 54 is designed so that angle $\Theta$ equals angle $\phi$. In this configuration, the outlet end 52 is in direct fluid communications with the gate portion 44 of the mold cavity 42 allowing the molten plastic to flow directly into the gate portion 44 then into the mold cavity 42 for forming the thermoplastic body.

During the injection molding process, the molten plastic material is maintained in a molten state by a heating means, such as heater member 70 that converts electricity to heat. The heater member 70 is positioned near the inlet end 51 of the channel 48 so as to provide effective heat transfer to the channel 48.

Turning again to FIG. 3, diameter (d) at the outlet end 52 of the channel 48 effects the process latitude of the hot tip 40. It is advantageous to have this diameter (d) larger than the gate diameter ($g_d$) so that particulate contamination does not get lodged in the outlet end 52. A preferred diameter (d) is 0.056 inches (0.142 cm) with a preferred corresponding gate diameter of 0.030 inches (0.076 cm).

As illustrated in FIGS. 3 and 4, body member 46 also includes a threaded portion 74 for removably attaching the hot tip 40 to equipment 50 within bore 76 having side walls 78. Threaded portion 74 is designed to cooperate with an oppositely threaded portion (not shown) of the equipment. Those skilled in the art will appreciate that other means of removably attaching hot tip 40 to equipment 50 may be equally as effective, such as bolting. Preferably the threaded portion 74 is positioned at the inlet end 51 of the channel 48, although other locations may suffice, e.g., near the outlet end 52 of the channel 48.

Further, in the preferred embodiment of the invention, there is provided means for precisely aligning both the threaded portion 74 of the body member 46 with an oppositely threaded portion of the equipment 50 to which the hot tip 40 is attached, and the outlet end 52 of the channel 48 with the gate portion 44 of the mold cavity 42. The preferred aligning means comprises a land surface 80 and a notch 82 adjacent to the land surface 80. Preferably, land surface 80 and adjacent notch 82 are positioned between the threaded portion 74 and the necked down portion 54 of the body member 46. It was determined that the preferred aligning means plays an important role in the transfer process and has a significant impact on molded part quality as well as the process latitude. In general, a reduction in the process latitude was experienced as the surface area of the land surface 80 increased, and the amount of contact between the land surface 80 and equipment 50 increased. Maintaining a minimal surface area on the land surface 80 minimizes the transfer of heat back to the equipment 50. Preferably, land surface has a width (w) of about 0.040 inches (0.100 cm) to about 0.045 inches (0.110 cm). In addition, the location of the aligning means plays an important role in the molding process. The closer the aligning means is located to the outlet end 52 of the channel 48 the smaller the molding latitude.

In another embodiment of the invention, equipment 50 (FIGS. 3–4) is provided for molding a body within a mold cavity 42 having a gate portion 44, as described above. The equipment 50 (only a fragmentary portion illustrated) includes an injection nozzle or improved hot tip 40 fully described above.

Further, in another embodiment of the invention, a method is provided of forming a thermoplastic body within a mold cavity 42 having a gate portion 44 and wherein an injection nozzle or hot tip 40 (as described fully above) is positioned proximately in the gate portion 44 so that molten material will flow directly into the gate portion 44. The method is advanced by next providing a molten thermoplastic material, such as an amorphous resin, for passing through the channel 48 into the mold cavity 42 for forming the body. Amorphous resins, such as polystyrene, are preferred because they have a clearly defined glass transition temperature that does not promote gate stringing problems, as described above. Further, the method requires the positioning of outlet end 52 of the channel 48 in proximate contact with the gate portion 44 of the mold cavity 42. In this way, the molten material will pass directly from the outlet end 52 of the channel 48 into the gate portion 44 of the mold cavity 42. Finally, in this embodiment of the invention, the molten material is passed through the inlet and outlet ends 51,52 of the channel 48 and directly into the gate portion 44 of the mold cavity 42 thereby forming the body. In an alternative embodiment, the step of providing means for maintaining the molten material in a molten state while passing through the channel 48 of the body member 46 can be implemented. A heater member 70 preferably positioned near the inlet end 51 of the channel 48 is the preferred means to maintain the molten material in a molten state during flow. Finally, when the mold cavity 42 is filled, the body is then ejected or separated from the mold.

In operation, the operator first installs the injection nozzle or hot tip 40, described above into the equipment 50. This is achieved by screwing the threaded portion 74 of the hot tip 40 into oppositely threaded portions of the equipment 50. The operator would then ensure that the outlet end 52 is aligned with the gate portion 44 of the mold cavity 42 with the aid of land surface 80 and notch 82. Next, the outlet end 52 is adjusted into proximate contact with the gate portion 44 by moving the necked down portion 54 body member 46 toward the gate portion 44 of the mold cavity 42. Since the angles $\Theta$ and $\phi$, described above, are equal there is no structure that can interfere with the movement of the outlet end 52 into proximate contact with the gate portion 44. Once the hot tip 40 is properly aligned and positioned, the set up process is complete and the molding process can then be initialized.

The invention has therefore been described with reference to certain embodiments thereof, but it will be understood that variations and modifications can be effected within the scope of the invention.

| PARTS LIST | |
|---|---|
| 1. Diverted hot tip (DHT) | 10 |
| 2. Orifices | 12, 14 |
| 3. Passage | 16 |
| 4. Center of tip | 18 |
| 5. Exterior of tip | 20 |
| 6. Gate portion (DHT) | 21 |
| 7. Mold Cavity (DHT) | 23 |
| 8. Conventional Hot tip (CHT) | 22 |
| 9. Passage (CHT) | 24 |
| 10. End (CHT) | 26 |
| 11. Interference portion (CHT) | 27 |
| 11. Gate portion (CHT) | 28 |
| 12. Mold Cavity (CHT) | 30 |
| 13. Improved Hot tip (IHT) | 40 |
| 14. Mold cavity (IHT) | 42 |
| 15. Gate portion (IHT) | 44 |
| 16. Body member (IHT) | 46 |
| 17. Channel (IHT) | 48 |
| 18. Equipment | 50 |
| 19. Inlet End (IHT) | 51 |
| 20. Outlet End (IHT) | 52 |
| 21. Necked down Portion (IHT) | 54 |
| 22. Walls | 58 |
| 23. Central axis | 59 |
| 24. Peripheral walls (IHT) | 60 |
| 25. Heater Member | 70 |
| 26. Threaded portion | 74 |
| 27. Land Surface | 80 |
| 28. Notch | 82 |

We claim:

1. An apparatus for forming a thermoplastic body, comprising:

a mold including a bore having side walls and a mold cavity having a gate portion, said gate portion including a first end for receiving molten material and a second end for delivering molten material to the mold cavity to form the thermoplastic body therein;

a hot tip mounted within said bore and including an elongated body member, a channel, and a necked down portion, said channel extending axially through said body for passing molten material therethrough, the channel having two ends and an inlet located at one end for receiving molten material and an outlet located at the other end for delivering molten material to the first end of the gate portion, said necked down portion of the body member surrounding the outlet and spaced from said side walls, said body member comprising a threaded portion at the inlet end for removably attaching to said mold, said threaded portion being capable of cooperating with an oppositely threaded portion in said mold, said body member including means for precisely aligning both said threaded portion with said oppositely threaded portion in said mold, and said outlet end with said gate portion of said mold cavity; and means for mounting said body to fixedly position said outlet relative to said first end of said gate portion, and for maintaining the fixedly position between said outlet and said first end when molten material is passing through said channel and when molten material is not passing through said channel, said necked down portion being configured such that said outlet is spaced from said first end of said gate portion by up to 0.015 inches to define an open annulus between said necked down portion and said side walls so as to allow molten material to pass through the channel into the first end of said gate portion of the mold cavity when molten material is flowing through said channel.

2. An apparatus according to claim 1 wherein said means for precisely aligning comprises a land surface having a width of about 0.040 inches to about 0.045 inches.

3. An apparatus according to claim 2 wherein said land surface is positioned between said threaded portion and said necked down portion.

4. An apparatus according to claim 1 wherein said necked down portion of said body member comprises a peripheral wall portion having a substantially conical shape.

* * * * *